(12) United States Patent
Clune et al.

(10) Patent No.: US 6,202,260 B1
(45) Date of Patent: Mar. 20, 2001

(54) TOUCH FASTENERS THEIR MANUFACTURE AND PRODUCTS INCORPORATING THEM

(75) Inventors: William Clune, Concord; William H. Shepard, Amherst, both of NH (US)

(73) Assignee: Velcro Industries B.V., Curacao (NL)

( * ) Notice: Subject to any disclaimer, the term of this patent is extended or adjusted under 35 U.S.C. 154(b) by 0 days.

(21) Appl. No.: 09/187,389

(22) Filed: Nov. 6, 1998

(51) Int. Cl.⁷ ........................................................ A44B 1/04
(52) U.S. Cl. .......................... 24/30.5 R; 24/446; 24/452; 24/445
(58) Field of Search ............................. 24/306, 422–452, 24/30.5 R; 428/100; 383/209, 204, 61, 81

(56) References Cited

U.S. PATENT DOCUMENTS

| | | |
|---|---|---|
| 3,372,438 | 3/1968 | Rinecker . |
| 3,417,440 * | 12/1968 | Billarant ............................. 24/446 |
| 3,464,094 | 9/1969 | Mates . |
| 3,557,853 | 1/1971 | Jones . |
| 3,594,865 * | 7/1971 | Erb ................................. 425/429.1 |
| 3,696,472 | 10/1972 | Perina et al. . |
| 3,807,626 | 4/1974 | Goodrich . |
| 4,567,987 | 2/1986 | Lepisto et al. . |
| 4,580,683 | 4/1986 | Gochenour . |
| 4,672,722 * | 6/1987 | Malamen ............................ 24/446 |
| 4,794,028 | 12/1988 | Fischer . |
| 4,824,261 | 4/1989 | Provost . |
| 4,955,981 | 9/1990 | Provost . |
| 5,088,164 | 2/1992 | Wilson et al. . |
| 5,172,980 | 12/1992 | Provost . |
| 5,215,380 * | 6/1993 | Caster et al. ........................ 383/61 |
| 5,260,015 | 11/1993 | Kennedy et al. . |
| 5,315,740 * | 5/1994 | Provost ............................... 24/452 |
| 5,369,847 | 12/1994 | Naya et al. . |
| 5,369,853 * | 12/1994 | Okawa et al. ....................... 24/446 |
| 5,413,568 | 5/1995 | Roach et al. . |
| 5,515,583 * | 5/1996 | Higashinaka ....................... 24/446 |
| 5,611,791 * | 3/1997 | Gorman et al. .................. 24/445 X |
| 5,669,120 | 9/1997 | Wessels et al. . |
| 5,699,593 * | 12/1997 | Jackson ............................... 24/445 |
| 5,745,961 * | 5/1998 | Okawa et al. ....................... 24/446 |
| 5,763,041 * | 6/1998 | Leak et al. ......................... 428/100 |
| 5,773,120 * | 6/1998 | Deka et al. .................... 428/100 X |
| 5,873,456 * | 2/1999 | Hull et al. ...................... 383/61 X |
| 5,887,320 * | 3/1999 | Provost ............................... 24/452 |
| 5,985,407 | 11/1999 | Murasaki . |

* cited by examiner

Primary Examiner—Robert J. Sandy
(74) Attorney, Agent, or Firm—Fish & Richardson P.C.

(57) ABSTRACT

A composite touch fastener has an elongated, sheet-form resin substrate, a fibrous loop strip partially encapsulated in, or otherwise permanently attached to, resin of the substrate, and an array of loop-engageable fastener elements integrally molded with resin of the substrate. The loop strip forms a discrete band of hook-engageable, free-standing loops along the length of the substrate, and has a substantially constant fiber density across its width. The array of fastener elements is arranged in a discrete band of fastener elements extending longitudinally along the substrate. The fastener product is useful as a repeated use bag closure, with a pair of grooves and a graspable rib integrally molded into the substrate between the fastener elements and loops. The center portion of the closure seals the bag until it is torn away to expose the mating bands of loops and fastener elements. Methods and apparatus are disclosed for continuously molding the resin of the substrate while permanently attaching preformed material, such as loop material staked in discrete regions, to resin of the substrate.

64 Claims, 8 Drawing Sheets

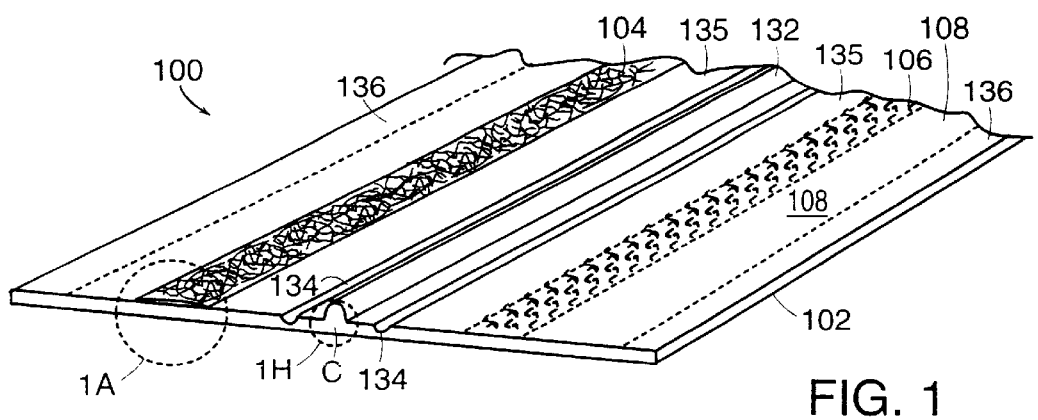
FIG. 1
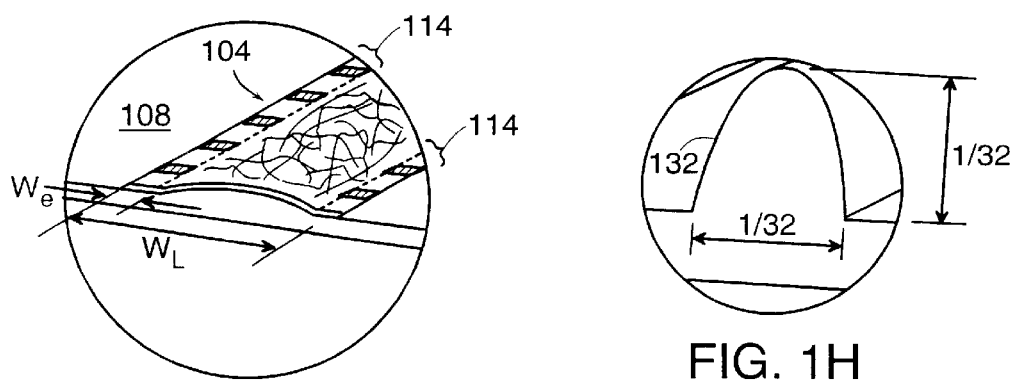
FIG. 1A
FIG. 1H
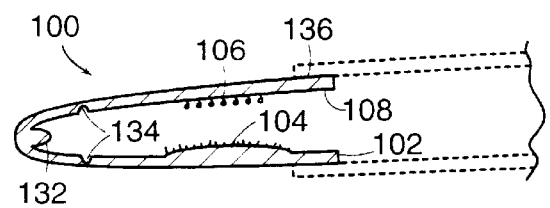
FIG. 3

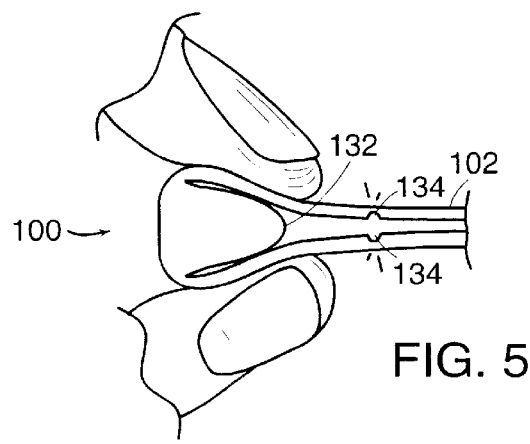
FIG. 5
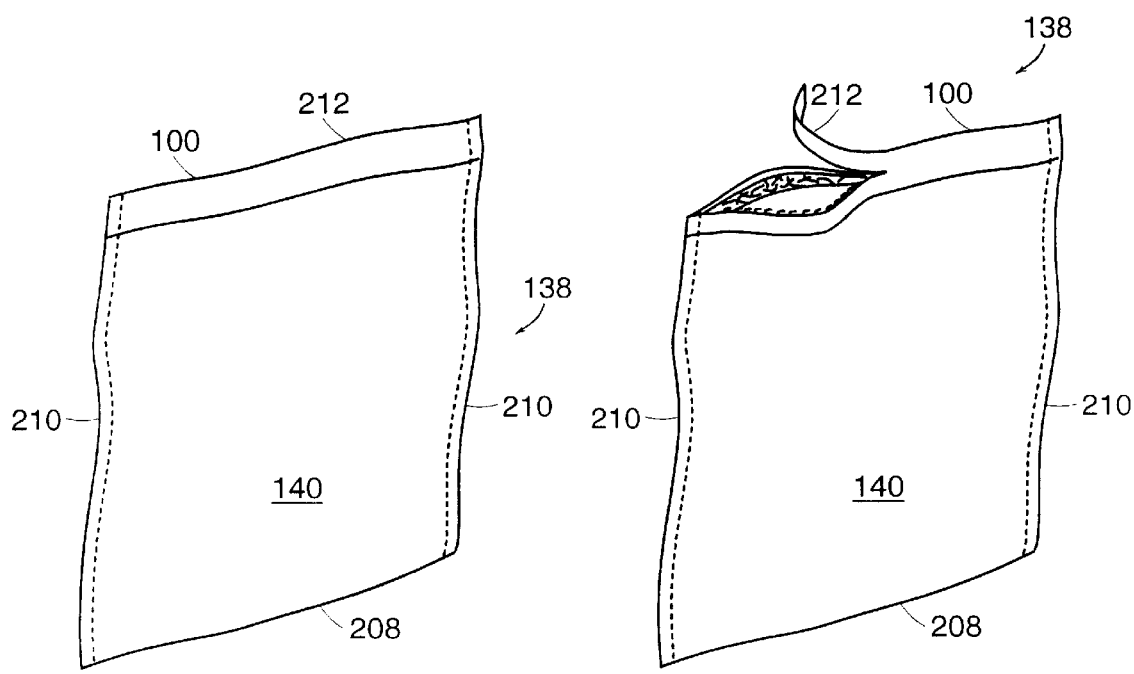
FIG. 4A
FIG. 4B

TOUCH FASTENERS THEIR MANUFACTURE AND PRODUCTS INCORPORATING THEM

BACKGROUND OF THE INVENTION

This invention relates generally to touch fasteners, and specifically to composite touch fasteners having both loops and loop-engageable fastener elements extending from one side of a common substrate, to their application in products such as closure strips for reclosable bags, and to methods and apparatus for their manufacture.

There has been much development over the last thirty years in the field of hook-and-loop fasteners. Early touch fastener products of this type consisted of two mating tapes, each being knit or woven. One tape would include loops of filament woven into a base, and the other would include filaments woven to form loops and then cut to form hooks. In some cases free ends of drawn plastic filaments on the male tape would be melted to form protruding heads. This shape of fastener element is sometimes called a "mushroom", to distinguish it from "hook"-shaped elements with re-entrant crooks.

More recently, continuous molding of fastener elements extending from a common sheet-form resin base has resulted in less expensive and thinner male tapes. Significant improvements in this area include the development of continuous fastener tape molding using fixed mold cavities (see Fischer, U.S. Pat. No. 4,794,028), and the ability to provide loops on the back side of the male fastener tape as the fastener tape substrate and elements are being formed (see Kennedy et al., U.S. Pat. No. 5,260,015), thus creating a composite fastener tape capable of fastening to itself. Further improvements have reduced the size of the fastener elements moldable by such techniques, to heights of 0.015 inch or less, which provide a very smooth touch when arranged in dense arrays.

As molded fastener tape has been improved to be more flexible and less expensive, it has found application in disposable garments, such as diapers. Further improvements are desirable to extend the applicability of molded touch fastener products to other uses.

One such use that is discussed in more detail below is as a closure for reclosable bags and other such packaging. Other types of repeated use closures for such bags include, for instance, the rib-and-groove type of closure such as is marketed under the name ZIPLOCK.

SUMMARY OF THE INVENTION

The invention features, in several of its aspects, a composite touch fastener product having both a band of loops and a band of hooks extending from a single face of a common, sheet-form substrate. Among other applications, this product can be included at the opening of a bag to function as a repeated use closure.

According to one aspect of the invention, an elongated closure strip includes a sheet-form resin substrate having a front face, a loop strip carried on the front face of the substrate, and an array of loop-engageable fastener elements integrally molded with resin of the front face of the substrate. The loop strip comprises a non-woven web of fibers forming a discrete band of hook-engageable loops extending along the length of the closure strip, and the array of fastener elements forms a discrete band of fastener elements extending longitudinally along the length of the closure strip and spaced apart from the band of loops.

The closure strip is preferably constructed to be folded along a region between the bands of fastener elements and loops to place these bands in releasable engagement.

In some embodiments, the loop strip comprises a non-woven web of entangled fibers forming the loops and having a basis weight of less than about 4 ounces per square yard (preferably, less than about 2 ounces per square yard). In some cases, the non-woven web comprises a needled web in a stretched condition.

In some embodiments, fibers of the loop strip are affixed to the substrate across the width of the loop strip, such as by being encapsulated by resin of the substrate.

By "width" of the loop strip, we mean the entire transverse dimension of the preformed strip, as measured between the outermost edges of the preformed strip before it is attached to the substrate.

In many cases, the loop strip has a fiber density which is substantially constant across its width, yet the loop strip has discrete regions which are more encapsulated by resin than other regions of the loop strip. These discrete, more encapsulated regions may be spaced apart longitudinally along the loop strip, extend lengthwise along the loop strip and be spaced apart widthwise, or be arranged in a checkerboard pattern, for instance.

When we refer to regions of the loop strip as being more "encapsulated" than other regions, we mean that the fibers of the more encapsulated regions are generally more thoroughly embedded in the resin of the substrate than the fibers of other regions. Generally, this will involve a deeper penetration of the substrate resin into the loop strip.

In some embodiments, longitudinal edge regions of the loop strip are affixed to the substrate, while a center region (between the edge regions) is substantially loose from the substrate. The center region of the loop strip may advantageously define a gentle arc extending away from the substrate in some of these embodiments.

In some configurations, a barrier layer (of a different material than the substrate) is included between the substrate and the loop strip. This barrier layer may be of paper or a polymer resin, for example.

In some cases the loop strip has at least one edge which is substantially loose from the substrate. This edge may be either an inner or outer edge in a finished bag, and can help to redirect peel separation forces to enhance the peel strength of the fastening.

In some closure strips, open-ended pockets are defined between an edge of the loop strip and the substrate. These pockets can also help to enhance peel strength in some cases.

In some embodiments, the edge regions of the loop strip have fibers directly encapsulated within resin of the substrate, while the closure strip also includes a binder (of a different material than the substrate) connecting fibers of the center region (between the edge regions) of the loop strip to resin of the substrate.

In some presently preferred embodiments, the substrate defines a pair of grooves extending longitudinally along the length of the closure strip between the band of loops and the band of fastener elements. These grooves are preferably lengthwise continuous and defined by molded surfaces in the front face of the substrate.

The closure strip also includes, in some cases, a longitudinal rib integrally molded with and extending from the front face of the substrate between the band of loops and the band of fastener elements. In some of these cases, the rib is disposed between the pair of grooves just described.

In some embodiments, the front face of the substrate has two longitudinal edge regions void of fastener elements and loops, for permanently adhering the substrate to the sides of a bag. These edge regions may be covered with a layer of adhesive for permanently attaching the closure strip to opposite sides of a bag, or comprise exposed resin of the substrate, for permanently welding the closure strip to opposite sides of a bag formed of a compatible material. These longitudinal edge regions may alternatively be disposed on the back face of the substrate.

The substrate of some embodiments of the closure strip is advantageously formed of polyethylene, such as for welding the substrate to polyethylene bag material.

Some embodiments of the closure strip also include an adhesive strip carried on the front face of the substrate between the band of fastener elements and the band of loops. The adhesive strip has an exposed surface arranged to contact the front face of the closure strip when the closure strip is folded to engage the loops with the fastener elements, to retain the closure strip in a folded state.

Alternatively, some embodiments have a first adhesive strip carried on the front face of the substrate between the band of fastener elements and the pair of grooves, and a second adhesive strip carried on the front face of the substrate between the band of loops and the pair of grooves. The first and second adhesive strips have exposed surfaces arranged to contact each other when the closure strip is folded to engage the loops with the fastener elements, to retain the closure strip in a folded state. In either case, these adhesive strips can advantageously provide an air-tight seal when the closure is closed.

In some embodiments, the closure strip includes a layer of paper permanently adhered to the substrate. In some cases, this layer of paper is carried on the front face of the substrate, in its longitudinal edge regions. In some cases, the paper is carried on the back face of the substrate. In some other cases, the layer of paper is disposed between a center region of the loop strip and the substrate.

According to a second aspect of the invention, an elongated closure strip includes a sheet-form resin substrate having front and back faces, a loop strip carried on the front face of the substrate, and an array of loop-engageable fastener elements carried on the front face of the substrate. The loop strip forms a discrete band of hook-engageable, free-standing loops along the length of the closure strip, and the array of fastener elements forms a discrete band of fastener elements extending longitudinally along the length of the closure strip and spaced apart from the band of loops. The substrate defines a pair of grooves extending longitudinally along the length of the closure strip between the band of loops and the band of fastener elements, and a longitudinal rib integrally molded with and extending from the substrate between the pair of grooves.

In some embodiments, the loop strip comprises a non-woven web of entangled fibers forming the loops and having a basis weight of less than about 4 ounces per square yard (preferably, less than about 2 ounces per square yard).

In some cases, the grooves and rib are disposed on the front face of the substrate. In other cases, they are disposed on its back face.

Various embodiments of this aspect of the invention contain various features described above with respect to the first aspect of the invention.

According to a third aspect of the invention, an elongated closure strip includes a sheet-form resin substrate having front and back faces, a loop strip carried on the front face of the substrate, and an array of loop-engageable fastener elements carried on the front face of the substrate. The loop strip forms a discrete band of hook-engageable, free-standing loops along the length of the closure strip, and the array of fastener elements forms a discrete band of fastener elements extending longitudinally along the length of the closure strip and spaced apart from the band of loops. The loop strip has width and a fiber density which is substantially constant across its width, and is at least partially encapsulated in resin of the substrate across its width, with the loop strip having discrete regions which are more encapsulated by resin than other regions of the loop strip.

Preferably, the fastener elements are integrally molded with resin of the substrate.

Various embodiments of this aspect of the invention contain various features described above with respect to the first aspect of the invention.

According to a fourth aspect of the invention, a reclosable bag includes a bag body and an elongated closure strip. The bag body has two opposing side walls joined along three edges to form therebetween a pouch having an open end. The closure strip is permanently affixed to the two side walls of the bag body along the open end, and includes a sheet-form resin substrate having a front face, a loop strip carried on the front face of the substrate, and an array of loop-engageable fastener elements integrally molded with resin of the front face of the substrate. The loop strip forms a discrete band of hook-engageable, free-standing loops along the length of the closure strip, and the array of fastener elements forms a discrete band of fastener elements extending longitudinally along the length of the closure strip and arranged to engage the band of loops to releasably retain the bag in a closed condition when the opposing sides of the bag body are pressed together at the open end.

Preferably, the loop strip of the closure strip comprises a non-woven web of entangled fibers forming the loops and having a basis weight of less than about 4 ounces per square yard (more preferably, less than about 2 ounces per square yard).

In some embodiments, the substrate of the closure strip defines a pair of grooves extending longitudinally along the length of the closure strip between the band of loops and the band of fastener elements, the pair of grooves spaced apart to define between them a band of substrate resin for retaining the bag in a closed condition until the closure strip is torn along the pair of grooves.

For some applications, the substrate is continuous and solid between the band of loops and the band of hooks and forms a seal to retain the bag in a sealed condition until the closure strip is torn along the pair of grooves.

In some embodiments, the substrate of the closure strip is permanently affixed to the side walls of the bag body with adhesive. In some other embodiments, the substrate of the closure strip is welded to the side walls of the bag body. The substrate of the closure strip and the side walls of the bag body may both be formed of polyethylene, for instance.

The closure strips of various embodiments of this aspect of the invention contain various features described above with respect to the first aspect of the invention.

According to a fifth aspect of the invention, a reclosable bag includes a bag body having two opposing side walls joined along three edges to form a pouch having an open end, and a closure strip permanently affixed to the two side walls of the bag body along the open end. The closure strip includes a sheet-form resin substrate having a front face, a loop strip carried on the front face of the substrate, and an array of loop-engageable fastener elements carried on the front face of the substrate. The loop strip forms a discrete band of hook-engageable, free-standing loops along the length of the closure strip, and the array of loop-engageable fastener elements forms a discrete band of fastener elements extending longitudinally along the length of the closure strip and arranged to engage the band of loops to releasably retain the bag in a closed condition when the opposing sides of the bag body are pressed together at the open end. The substrate defines a pair of grooves extending longitudinally along the length of the closure strip between the band of loops and the band of fastener elements, the pair of grooves spaced apart to define between them a band of substrate resin for retaining the bag in a closed condition until the closure strip is torn along the pair of grooves. The substrate also defines a longitudinal rib integrally molded with and extending from the substrate between the pair of grooves, the rib having thickness and arranged to be grasped between adjacent regions of the substrate and pulled to tear the closure strip along the pair of grooves.

In some embodiments, the substrate is continuous and solid between the band of loops and the band of hooks and forms a seal to retain the bag in a sealed condition until the closure strip is torn along the pair of grooves.

Preferably, the fastener elements are integrally molded with resin of the substrate.

According to a sixth aspect of the invention, a method of fabricating a closure strip is provided. The closure strip is in the form of a sheet-form resin substrate having a front face, with both a loop strip and an array of loop-engageable fastener elements carried on the front face of the substrate. The loop strip has width and forms a discrete band of hook-engageable, extended loops along the length of the closure strip. The array of loop-engageable fastener elements forms a discrete band of fastener elements extending longitudinally along the length of the closure strip and spaced apart from the band of loops, the substrate having a frangible section between the band of loops and the band of fastener elements. The method includes the steps of molding a continuous, sheet-form substrate having both a band of fastener elements integrally molded with and extending from its front face, and a frangible section, and attaching a continuous strip of loop material to resin forming the front face of the substrate to form a band of loops, with the frangible section of the substrate disposed between the band of loops and the band of fastener elements.

In some embodiments, the frangible section defines a pair of longitudinally extending grooves in the substrate, and the step of molding includes forming the grooves in the substrate as the substrate is formed. The step of molding also includes, in some instances, simultaneously forming a longitudinal rib extending from the substrate between the pair of grooves. In some cases, the rib and grooves are molded on the front face of the substrate.

In some embodiments, the step of attaching encapsulates fibers of the strip of loop material in resin of the substrate across the width of the strip of loop material.

In some embodiments where the strip of loop material has a fiber density which is substantially constant across its width, the step of attaching includes permanently bonding discrete regions of the strip of loop material to the substrate while leaving other regions of the strip of loop material in a less bonded condition.

In some embodiments of the method, the strip of loop material is permanently attached to the substrate after the substrate is molded. For instance, the strip of loop material may be attached to the substrate by heating the front face of the substrate and then pressing the loop material against the front face of the substrate with the front face of the substrate at an elevated temperature.

In some other embodiments, the strip of loop material is permanently attached to the substrate as the substrate is molded. For instance, in one preferred method the steps of molding and attaching include continuously feeding the strip of loop material through a nip defined between a rotating mold roll and a pressure roll (the rotating mold roll defining a multiplicity of cavities about its periphery for molding the fastener elements) while continuously introducing molten resin to the mold roll under conditions which cause the resin to fill the cavities and form the substrate, such that pressure in the nip bonds the strip of loop material to resin of the substrate.

In some cases, the mold roll has two extending ridges that form a pair of grooves in the substrate.

The step of molding, in some embodiments, includes simultaneously forming a longitudinal rib extending from the substrate between the pair of grooves (the mold roll defining, between its two ridges, a channel for forming the longitudinal rib).

In some other embodiments in which the strip of loop material is permanently attached to the substrate as the substrate is molded, the steps of molding and attaching include continuously feeding the strip of loop material through a gap defined between a rotating mold roll and a stationary extrusion head (the rotating mold roll defining a multiplicity of cavities about its periphery for molding the fastener elements), while continuously introducing molten resin to the gap under conditions which cause the resin to fill the cavities and form the substrate and to permanently adhere to the strip of loop material.

For some applications the method also includes, while continuously feeding the strip of loop material through the gap, continuously feeding a strip of preformed material through the gap between the strip of loop material and the extrusion head, such that the preformed material inhibits the encapsulation of fibers of the strip of loop material in predetermined regions and the preformed material is incorporated into the closure strip.

This preformed material is preferably selected from the group consisting of paper, fabric and plastic film, and may have perforations through it for allowing heavier penetration of substrate resin in some predetermined areas.

The closure strips employed in various embodiments of this aspect of the invention contain various features described above with respect to the first aspect of the invention.

According to a seventh aspect of the invention, a method of fabricating reclosable bags is provided. The method includes the steps of:

(a) providing a continuous length of sheet-form plastic, folded along its length and having two exposed longitudinal edges;

(b) providing a continuous closure strip folded along its length and having two exposed longitudinal edges (the closure strip having a sheet-form resin substrate with a front face, a loop strip carried on the front face of the substrate and forming a discrete band of hook-engageable, free-standing loops along the length of the closure strip, and an array of loop-engageable fastener elements integrally molded with the front face of the substrate and forming a discrete band of fastener elements extending longitudinally along the length of the closure strip and spaced apart from the band of loops, as described above);

(c) permanently attaching the longitudinal edges of the sheet-form plastic to the longitudinal edges of the closure strip to form a continuous preform tube; and (d) forming sealed individual bags from the preform tube.

In some embodiments, the step of forming sealed individual bags includes cutting the continuous preform tube to predetermined lengths (each cut length comprising a section of closure strip and a section of sheet-form plastic), sealing a first open end of each cut length of preform tube, and sealing a second open end of each cut length of preform tube to form a sealed bag. In many cases, between the steps of sealing the first and second open ends, each cut length of preform tube is filled with material to be stored in the sealed bag.

In some embodiments, the step of forming sealed individual bags includes:

(d1) sealing the tube at a sealing point spaced from one end of the tube to form an end pouch with a single opening;

(d2) filling the end pouch with material;

(d3) sealing the single opening of the end pouch to form a sealed bag containing the material;

(d4) separating the sealed bag from the tube by severing the tube below the sealing point;

(d5) advancing the tube; and (d6) repeating steps (d1) through (d5).

In some embodiments, the substrate of the closure strip defines a pair of grooves extending longitudinally along the length of the closure strip between the band of loops and the band of fastener elements, with the pair of grooves spaced apart to define between them a band of substrate resin for retaining the bag in a closed condition until the closure strip is torn along the pair of grooves.

The closure strips employed in various embodiments of this aspect of the invention contain various other features described above with respect to the first aspect of the invention.

According to an eighth aspect of the invention, a composite touch fastener has an elongated, sheet-form resin substrate with a front face, a fibrous loop strip partially encapsulated in resin of the front face of the substrate, and an array of loop-engageable fastener elements integrally molded with resin of the front face of the substrate. The loop strip forms a discrete band of hook-engageable, free-standing loops along the length of the substrate, the loop strip having a substantially constant fiber density across its width between its two longitudinal edges. The array of loop-engageable fastener elements forms a discrete band of fastener elements extending longitudinally along the substrate.

In some embodiments, the loop strip comprises a non-woven web of entangled fibers forming the loops. Preferably, the web has a basis weight of less than about 4 ounces per square yard (more preferably, less than about 2 ounces per square yard). The non-woven web may be in the form of a needled web in a stretched condition, for instance.

Various composite touch fasteners of this aspect of the invention contain features described above with respect to the first aspect of the invention.

According to a ninth aspect of the invention, a composite touch fastener includes an elongated, sheet-form resin substrate, a fibrous loop strip partially encapsulated in resin of the substrate, with the loop strip having discrete regions which are substantially more encapsulated by resin than other regions thereof, and an array of loop-engageable fastener elements integrally molded with resin of the substrate.

In some embodiments, the loop strip has a substantially constant fiber density across its width.

In some cases, the strip of loop material has regions of substantially higher loft than regions corresponding to the discrete regions which are substantially more encapsulated by resin.

By "loft", we mean the distance the exposed loops of the loop material extend from the front face of the substrate, as presented for engagement by fastener elements.

In some embodiments, the strip of loop material comprises a non-woven web of entangled fibers forming the loops and having a basis weight of less than about 4 ounces per square yard.

Various composite touch fasteners of this aspect of the invention contain features described above with respect to the first aspect of the invention.

According to a tenth aspect of the invention, a method of fabricating a composite touch fastener is provided. The composite touch fastener is in the form of an elongated, sheet-form resin substrate having a front face, with both a loop strip and an array of loop-engageable fastener elements carried on the front face of the substrate. The loop strip has width and forms a discrete band of hook-engageable, exposed loops extending longitudinally along the substrate. The array of loop-engageable fastener elements forms a discrete band of fastener elements extending longitudinally along the length of the substrate. The method includes the steps of molding a continuous, sheet-form substrate having a band of fastener elements integrally molded with and extending from its front face, and attaching a continuous strip of loop material to resin forming the front face of the substrate to form a band of loops.

Preferably, the strip of loop material comprises a non-woven web of entangled fibers forming the loops and having a basis weight of less than about 4 ounces per square yard (more preferably, less than about 2 ounces per square yard).

In some embodiments, the strip of loop material has a fiber density which is substantially constant across its width, yet the step of attaching permanently bonds discrete regions of the strip of loop material to the substrate while leaving other regions of the strip of loop material in a less bonded condition.

In some cases, the strip of loop material is permanently attached to the substrate as the substrate is molded. For instance, in some preferred methods, the steps of molding and attaching include continuously feeding the strip of loop material through a gap defined adjacent a rotating mold roll (defining a multiplicity of cavities about its periphery for molding the fastener elements), while continuously introducing molten resin to the mold roll under conditions which cause the resin to fill the cavities and form the substrate, such that pressure in the gap bonds the strip of loop material to resin of the substrate.

In some cases, the gap is a nip defined between the mold roll and a pressure roll.

In some other cases, the gap is defined between the mold roll and a fixed extrusion head.

In some embodiments, the mold roll contains at least one staking ring having a contoured outer edge, the staking ring arranged to hold a predetermined region of the strip of loop material against the resin under pressure in the gap.

In one presently preferred configuration, the outer edge of the staking ring has protrusions spaced about its periphery, the protrusions corresponding to discrete regions of relatively greater encapsulation of the strip of loop material.

In some cases, the mold roll has multiple staking rings arranged to produce a predetermined bonding pattern across the strip of loop material.

According to a eleventh aspect of the invention, a method of fabricating a composite touch fastener is provided. The touch fastener is in the form of an elongated sheet-form resin substrate carrying both a preformed material and an array of loop-engageable fastener elements integrally molded with the substrate. The method includes molding a continuous, sheet-form substrate having a band of fastener elements integrally molded with and extending from the substrate, by continuously introducing molten resin to a gap defined adjacent a rotating mold roll defining a multiplicity of cavities about its periphery for molding the fastener elements, under conditions which cause the resin to fill the cavities and form the substrate, while permanently attaching a continuous strip of preformed material to resin of the substrate in a nip defined between the mold roll and a pressure roll, by causing pressure variations within the nip. The pressure variations result in regions of relatively high penetration of substrate resin into the preformed material and regions of relatively low penetration of substrate resin into the preformed material.

In some preferred embodiments, the mold roll has protrusions extending radially into the nip, for causing local increases in nip pressure that correspond to the regions of relatively high penetration of substrate resin.

In some embodiments, the pressure roll has protrusions extending radially into the nip, the protrusions causing local increases in nip pressure that correspond to the regions of relatively high penetration of substrate resin.

In some cases, the gap and the nip are coextensive. In some other cases, the gap is defined between the mold roll and a fixed extrusion head.

In some embodiments, the regions of relatively high penetration of substrate resin into the preformed material are arranged in a checkerboard pattern along the strip of preformed material.

In some configurations, the array of fastener elements is disposed on a front face of the substrate and the strip of preformed material is attached to a back face of the substrate. The preformed material is, in some embodiments, coextensive with the back face of the substrate.

In some other configurations, the strip of preformed material and the array of fastener elements are both disposed on a common side of the substrate.

In some embodiments, the strip of preformed material comprises a strip of loop material having exposed loops arranged for releasable engagement by the fastener elements.

According to a twelfth aspect of the invention, an apparatus for fabricating a composite touch fastener is provided. The composite touch fastener, as described above, is in the form of an elongated sheet-form resin substrate having a front face, a loop strip carried on the front face of the substrate (the loop strip having width and forming a discrete band of hook-engageable, extended loops along the length of the touch fastener), and an array of loop-engageable fastener elements carried on the front face of the substrate and forming a discrete band of fastener elements extending longitudinally along the substrate. The apparatus includes a rotating mold roll defining a multiplicity of fixed cavities about its periphery for molding the fastener elements, means of supplying molten resin to the mold roll under conditions which cause the resin to fill the cavities and form the substrate, means of supplying a continuous strip of loop material between the molten resin and the mold roll under conditions which cause the strip of loop material to permanently bond to the front face of the substrate, and means of stripping the fastener elements from the cavities. The "means" elements of the apparatus will be understood to be those discussed or represented schematically herein or in the disclosures incorporated by reference, and their equivalents.

As a repeated use closure, the product of the invention provides a ventilated, easily alignable seal. As the bands of loops and fastener elements are relatively wide, there is no need for accurate alignment to form a reliable closure. The closure is able to accommodate a fair amount of dirt or debris without losing its function as a closure, making it particularly applicable as a closure for bags containing granular or powder substances. In addition, the natural porosity of the closure can provide some degree of filtering of airborne dust. Such a ventilated closure can be particularly desirable in cargo containers of airplanes in order to accommodate pressure changes, and, by its venting action, may help to avoid moisture buildup to keep produce and other such items fresh. The groove and rib tear strip molded into the center of the closure strip in some cases advantageously maintains an air-tight seal until the bag is initially opened. The continuous closure strip provided by the invention is readily adaptable to standard bag-making equipment and, in many instances, is directly weldable to compatible bag materials. These advantages accrue to bags produced according to the invention and having such a repeated use closure.

If made of an appropriate width, the closure strip of the invention can be folded and sealed to itself to form an enclosed bag.

By employing a very light, non-woven loop material and integrally molded fastener elements in several instances, the resulting product is relatively inexpensive and flexible.

The product of the invention is also useful in other applications, either as a packaging closure or as a general purpose fastener. Encapsulating fibers of the loop material in a predetermined pattern of alternating regions of light and heavy encapsulation can produce regions of particularly high loft in which hook-engageable fibers are particularly well-presented for engagement.

As a method of producing fastener products, the invention also provides a reliable method of securing very lightweight loop materials to the front face of a resin substrate having fastener elements, in many cases without adhesives and while the substrate and fastener elements are themselves being formed, eliminating a post-forming attachment step. The method does not require the loop material to have a variable fiber density to provide for variable resin penetration, and can therefore accommodate and locally bond loop materials having a homogeneous fiber density. As fibers of the loop material are, in many instances, directly encapsulated within resin of the substrate, undesirable delamination of loop material from the substrate is avoided during high peel loads. And, as the fastener elements are, in many cases, integrally molded with the substrate, delamination between the fastener elements and the substrate is also avoided. The fastener elements and resin substrate (including any tear strip features such as ribs and grooves appropriate for closure strips) can be molded in a single continuous process from the same flow of resin, with the loop material fed right through the substrate-forming gap or nip on the side of the resin adjacent the fastener element-forming mold roll.

By appropriately controlling the forming speed and resin temperature and pressure (the optimal values of which are interdependent and will depend on the type of resin employed and the geometry of the product, as will be understood by those of normal skill in the art), the resulting penetration of substrate resin into the loop material may be controlled so as to not completely flood the exposed surface of loops with resin. In many applications, the use of appropriately contoured staking rings in the region of the mold roll adjacent the loop material can help to form a pattern of lofted regions of loop material which are less penetrated by resin than other areas. Such lofted regions can extend loops for ready engagement by fastener elements.

The apparatus of the invention can provide an efficient means of carrying out the steps of the inventive method described above, to produce a continuous strip of fastener product.

Other features and advantages of the invention will be apparent from the following description of embodiments, and from the claims.

BRIEF DESCRIPTION OF THE DRAWING

FIG. 1 is a perspective view of a composite touch fastener in the form of a closure strip.

FIGS. 1A and 1H are enlarged views of areas 1A and 1H, respectively, in FIG. 1.

FIG. 3 is a cross-sectional view of the closure strip, folded and installed at the opening of a bag in a sealed condition.

FIGS. 4A and 4B illustrate a bag with the closure strip of FIG. 1, in sealed and opened conditions, respectively.

FIG. 5 is an enlarged cross-sectional view of the outer edge of the closure strip being grasped to open the bag.

DESCRIPTION OF EMBODIMENTS

Figure 1B:
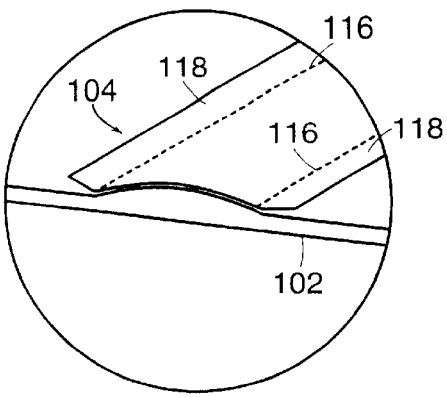
FIGS. 1B through 1G illustrate the structure of area 1A in various other closure strip embodiments.

Referring to FIG. 1, a lengthwise-continuous closure strip 100, such as for sealing a bag, consists of a thin, sheet-form resin substrate 102 with lengthwise-continuous, parallel bands 104 and 106 of loops and fastener elements, respectively, on its front face 108. Bands 104 and 106 are equally spaced from the center "C" of the closure strip, such that when the strip is folded longitudinally at "C" to cover front face 108, the fastener elements of band 1066 engage and retain the loops of band 104 to form a releasable fastening. The fastener elements 110 of band 106 are integrally molded with and extend from front face 108. In this embodiment, these fastener elements are in the form of J-hooks that extend, in rows, along the length of the closure strip. Some of the J-hooks face in opposite directions along the strip. Other fastener element shapes may also be employed, including those that overhang the substrate 102 in a widthwise direction. A suitable fastener element shape is the CFM29 hook shape (of about 0.015 inch in height), available in various products sold by Velcro USA in Manchester, N.H.

Band 104 of loops consists of a preformed, non-woven web of polymer fibers, which may include a stabilizing binder, and which are bonded to front face 108 of substrate 102 at various points across the width and length of the web. Suitable loop materials include those disclosed in U.S. patent application Ser. No. 08/922,292, the entire disclosure of which is hereby incorporated by reference as if fully set forth.

In producing the batt from which the loop material described in the above-referenced patent application is made, the material may be stretched during carding and pulled into a cloth-like mat consisting primarily of parallel fibers. With nearly all of its fibers extending in the carding direction, the mat has some strength when pulled in the carding direction but almost no strength when pulled in the carding cross direction, as cross direction strength results only from a few entanglements between fibers. During crosslapping, the carded fiber mat is laid in an overlapping zigzag pattern, creating a batt of multiple layers of alternating diagonal fibers. The diagonal layers, which extend in the carding cross direction, extend more across the apron than they extend along its length. For instance, we have used batt which has been crosslapped to form layers extending at anywhere from about 6 to 18 degrees from the cross direction of the finished product. The material properties and the manufacturing process can be affected by the crosslapping angle. A steeper angle may balance the cross and machine direction strengths, which may affect fastener performance and the ease of manufacturing. With more machine directional crosslapping, in some cases the initial machine direction stretch may be eliminated.

In another embodiment of forming the loop material (not illustrated), the second needling stage is omitted. Instead, needle looms of the first needling stage are configured to super-needle the batt in both directions. One loom needles the batt from the top at a rate of 254 punches per square inch (39 per square cm), with the needles penetrating the batt and extending through the bottom of the batt a distance of 10.2 millimeters. Another loom then needles the batt from the bottom at a rate of 254 punches per square inch (39 per square cm), with the needles penetrating the batt and extending through the top of the batt a distance of 7.1 millimeters to form loops on the top side of the batt. The needling density, speed, and penetration of the looms may be varied to produce a product with substantially no backside loops, or with hook-engageable loops extending from both sides.

The binder used in the loop material may be at least partially in liquid form to wick into the entanglements before and while they are subsequently tightened during stretching.

The non-woven web starting material used to manufacture the loop component may be a fairly dense, needle punched, non-woven web of fibers lying in an apparently chaotic and tangled manner. This web is first stretched to 130 percent of its initial length in the machine direction. This stretching results in necking—the material narrows to 80 percent of its initial width, from 45 inches (114 cm) to 36 inches (91 cm). It is then coated with a binder. Next, it is stretched to 175% of its necked width, from 36 inches (91 cm) to 63 inches (160 cm). An alternative process employs heated rolls or "hot cans" or platens to stabilize the back side of the fabric in its stretched condition. This does not require a coating or adhesive when using thermoplastic fibers, as the fibers are locally fused together by heat. Cooled rolls engage the loop side of the fabric during passage, to prevent damage to the hook-engageable loops.

Preferably, the non-woven loop material in band 104 is very thin, such as less than about 0.040 inch thick (more preferably, less than about 0.020 inch thick), with web fibers held in a transversely stretched condition and free-standing loop structures extending from its exposed surface. As discussed in the above-referenced patent applications, the loop structures extend from associated knots in the stretched web, which may be stabilized by liquid binder wicked into the knots and cured. Between knots, the thin fiber mat is not very dense and is sheer enough to permit images to be readily seen through it. Overall, the loop material has a basis weight (in its preformed state, including any pre-applied binder) of less than about 4 ounces per square yard (136 grams per square meter), preferably less than about 2 ounces per square yard (68 grams per square meter). Other details of this loop material may be found in the above-referenced applications. For applications in which the loop material is partially penetrated by resin of the substrate as the substrate is formed (as discussed below), the needled loop material is preferably only stretched in a transverse direction only about 22 percent to leave a fair amount of loft and avoid total penetration.

In some instances, loop material 104 is partially encapsulated directly in resin of the substrate as the substrate is formed in a continuous molding process (described below). In other cases, it is bonded to the formed substrate, either by ultrasonic bonding, welding, or adhesives.

FIGS. 1A through 1D illustrate various patterns of variable bonding between loop material 104 and substrate 102. Such variable bonding patterns correspond, in some cases, to variable resin penetration into the web of the loop material, which may be achieved by employing different arrangements of staking rings and/or barrier materials between the loop material and substrate, both of which are discussed further below. In FIG. 1a, loop material 104 is only fully penetrated by substrate resin in narrow edge regions 114, and is less penetrated at its center. For instance, if loop material is about ¾ inch wide ($W_L$), then fully penetrated edge regions 114 may have a width of only about ⅛ inch ($w_e$). The center region of the loop material is less penetrated and gently arches away from the substrate, presenting the loops for engagement. The inclined sides of the center arch can also help to enhance the peel strength of the fastening at the edges of the loop material, as they resolve a small component of the peel force in a tangential, or shear, direction.

Figure 2A:
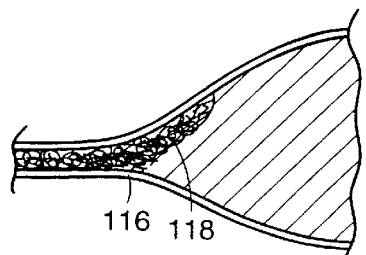
FIG. 2A illustrates the application of fill-shifting loads in a bag having the closure strip of FIGS. 1 and 1B.
Figure 2B:
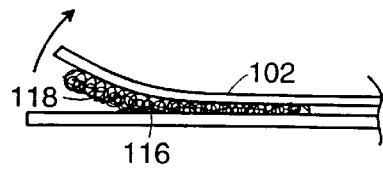
FIG. 2B illustrates the application of peel force to the closure strip of FIGS. 1 and 1B.

In FIG. 1B, the loop material is fully bonded to the substrate in narrow bands 116 spaced inward from its edges, leaving edge regions 118 relatively lightly bonded, or even loose. One advantage of this bonding pattern is that the inner edge region 118 on the inside of the associated bag helps to deflect separation loads caused by shifting bag contents, which would otherwise generate high peel forces between the fastener elements and the loops, into separation forces between the loop material and substrate (as illustrated in FIG. 2A). The high bonding strength of inner band 118 helps to avoid delamination of the loop material from the substrate. Another advantage of this bonding pattern is that it enhances initial peel strength of the fastening, as the outer edge region 118 of the loop material follows the fastener elements during peel until it is separated in shear (FIG. 2B).

Figure 1C:
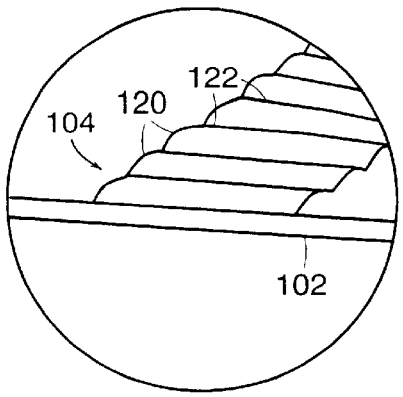

The pattern of variable bonding shown in FIG. 1C creates transverse pillows 120 of relatively lightly bonded, or loose, loop material separated by transverse bands 122 of relatively more fully bonded (e.g., more deeply encapsulated) loop material. The loftiness of pillows 120 is exaggerated for illustration. This pattern provides some of the peel-enhancing and load-shifting advantages of the pattern of FIG. 1B, due to the "free" pillow ends along the inner and outer edges of the loop material.

Figure 1D:
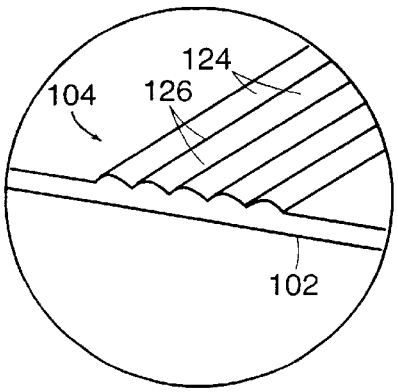
Figure 1E:
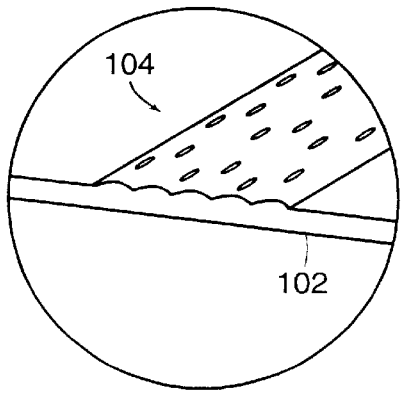
Figure 1F:
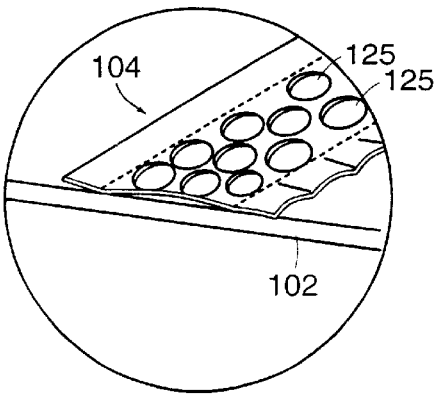
Figure 1G:
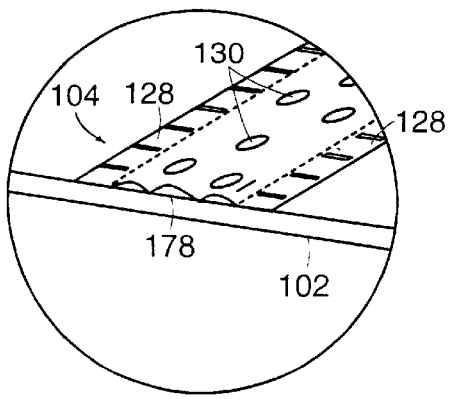

FIG. 1D illustrates a bonding pattern with longitudinal pillows 124 of relatively lightly bonded, or loose, loop material, separated by longitudinal bands 126 of relatively more fully bonded (e.g., more deeply encapsulated) loop material. Again, the loftiness of the pillows is exaggerated for illustration. FIG. 1E is a variation of the pattern of FIG. 1D, with each longitudinal band of more fully bonded material separated into longitudinally alternating regions of light and heavy bonding. The regions of light and heavy bonding are staggered across the loop material, producing a checkerboard pattern of lofted loop pillows. In the pattern illustrated in FIG. 1F, the center region of loop material 104 is heavily bonded to the substrate about the peripheries of spaced apart, circular lofted regions 125 which are less firmly bonded. The exposed surfaces of the lofted loop pillows 125 extend outward to present loops for engagement. Other shapes of lofted regions 125, such as ovals, may also be employed. One of the edge regions of the loop material of FIG. 1F is similar to the edge regions shown in FIG. 1B, while the other forms transverse pillows similar to those of FIG. 1C. FIG. 1G shows a bonding pattern with edge regions 128 of alternating light and heavy bonding, and a center region bonded in only isolated regions 130. The bonding patterns described above may be mixed and varied for different applications, as required.

Referring back to FIG. 1, molded into the front face 108 of substrate 102 along its center is a hump-shaped longitudinal rib 132 between a pair of grooves 134 molded into front face 108. As shown in FIG. 1H, one example of this rib 132 has a height of about ¹⁄₃₂ inch and a width of about ¹⁄₃₂ inch at its base. The rib may have a hump-shaped profile, as shown, or a rectangular cross-section with parallel sides. The rib is preferably longitudinally continuous, as shown, but may alternatively be formed as a row of appropriately shaped protrusions. At least one of the flat regions 135 between grooves 134 and the loop and hook bands 104 and 106 in FIG. 1 contains, in some cases, a layer of adhesive such as a pressure sensitive adhesive (not shown), for providing a reclosable seal for applications where a resealable opening is desired. In these instances surfaces 135 provide an airtight, non-ventilated seal when the bag is closed, and supplement the mechanical closure strength of the hook and loop fasteners. Preferably, an adhesive is employed which has been compounded so that it sticks primarily only to itself or to the opposing face of the substrate, so as to not pick up excessive debris from the bag contents. In other, non-illustrated embodiments, either grooves 134 or rib 132, or both, are formed on the back face of the substrate, opposite the fastener elements and loop material.

The formed closure strip 100 is permanently installed at the openable end of a bag by attaching edge regions 136 of the closure strip to outer edges of the bag at its opening, with the loop and hook bands facing each other, as shown in FIG. 3. The bag may be attached to the back face of the closure strip as shown, in which case edge regions 136 are defined on the back face of the closure strip, or on the front face, with the edges of the bag on the inside. Methods of attaching the closure strip to the bag include, but are not limited to, welding, gluing, adhering or stitching. One preferable method of attaching a closure strip to a bag of a compatible resin is by directly welding the resin of the closure substrate to the resin of the bag, as discussed below. In this manner, polyethylene closure strips may be readily welded to polyethylene bags.

FIG. 4A illustrates a sealed bag 138 having a polyethylene body 140 welded to closure strip 100 across its openable end. Preferably, the thickness of the substrate of the closure strip is about the same as the thickness of the material of the bag body, in the range of 0.002 to 0.005 inch. Substrates of up to at least 0.015 inch in thickness, however, may be produced by the methods described below. To initially break the seal and open the bag, the outer fold of closure strip 100 is grasped and pulled, thereby tearing the folded edge from the bag from one end of the bag to the other, as shown in FIG. 4B. In grasping the outer fold of the closure strip, the middle rib 132 is grasped between the thumb and forefinger. Rib 132 thus provides an edge of increased thickness for easy grasping. As the folded edge of the closure strip is torn away, the closure strip tears along grooves 134. Grooves 134 function as frangible tear points for initially opening the associated bag, and may be straddled by an associated local thickening of the substrate, such as in the form of rows of raised bumps (not shown) to direct the propagation of the tear along the grooves.

Figure 6:
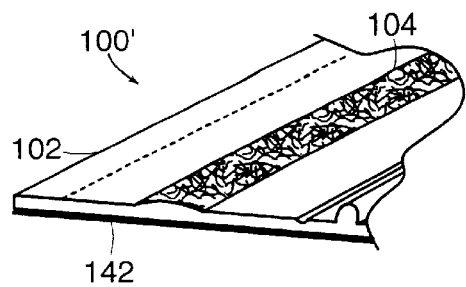
FIG. 6 is a perspective view of a closure strip having a paper backing.

Preferably, the resin of the substrate of the closure strip is compatible with the resin of the bag body, to enable direct welding of the two together. In situations where this is not practical, a separate layer of a bag-compatible material may be provided on the closure strip. For example, a layer of paper 142 may be bonded to either the front face of the closure strip (e.g., in edge regions 136 in FIG. 1), or across the back face of the closure strip as shown in FIG. 6, or along just the edges of the back face of the closure strip (not shown). The paper 142 may be directly bonded to the resin of the substrate (e.g., during the forming of the substrate, as described below), or joined with adhesive after the substrate is formed.

Figure 7:
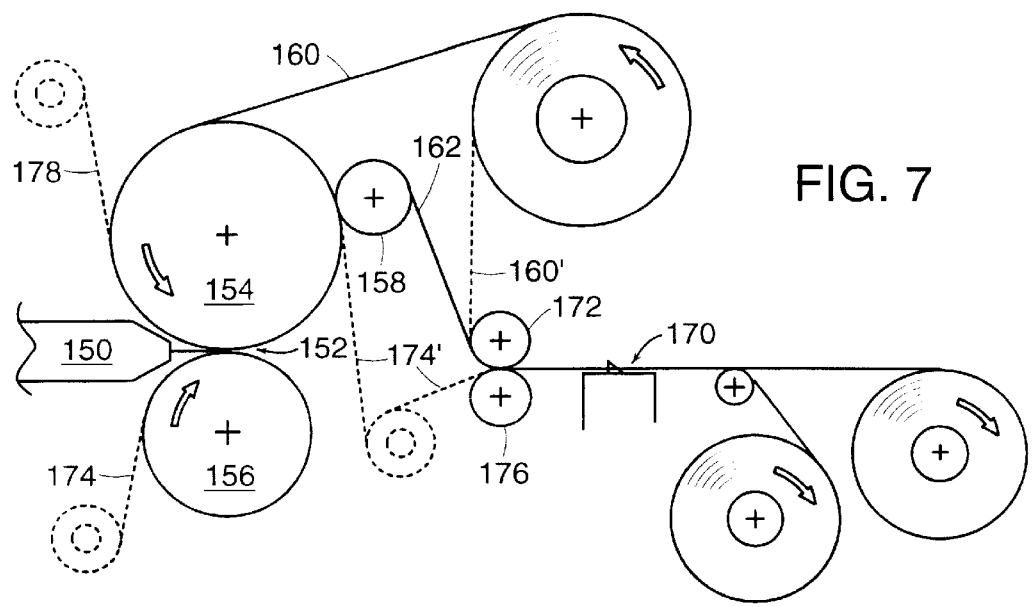
FIG. 7 illustrates a first method and apparatus for forming composite touch fastener tapes, such as the closure strips of FIGS. 1 and 6.

FIG. 7 illustrates one method and apparatus for producing the above-described closure strips. The method builds upon the continuous extrusion/roll-forming method for molding fastener elements on an integral, sheet-form base described by Fischer in U.S. Pat. No. 4,794,028, and the nip lamination process described by Kennedy, et al. in U.S. Pat. 5,260,015, the details of both of which are incorporated herein by reference. The relative position and size of the rolls and other components is not to scale. An extrusion head 150 supplies a continuous sheet of molten resin to a nip 152 between a rotating mold roll 154 and a counter-rotating pressure roll 156. Mold roll 154 contains an array of miniature, fastener element-shaped mold cavities extending inward from its periphery (not shown) for molding the fastener elements. Pressure in nip 152 forces resin into the fastener element cavities and forms the substrate. The formed product is cooled on the mold roll until the solidified fastener elements (e.g., hooks) are stripped from their fixed cavities by a stripper roll 158. Along with the molten resin, a continuous strip of loop material 160 (which becomes loop band 104 in FIG. 1) is fed into nip 152, where it is partially impregnated by resin and becomes permanently bonded to the front face of the substrate. Thus the product 162 which is stripped from the mold roll includes both fastener elements and loops.

Figure 8:
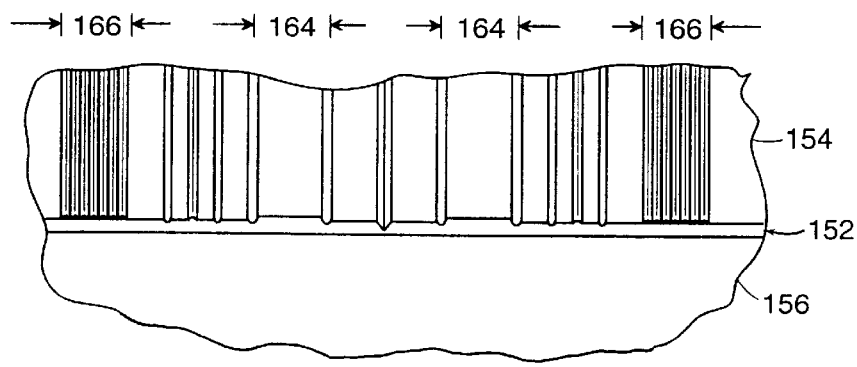
FIG. 8 is an enlarged, unscaled view of the forming nip of the apparatus of FIG. 7.

For higher production rates, two or more widths of closure strip may be simultaneously produced on a single mold roll, and later split and spooled. Referring also to FIG. 8, two strips 160 of loop product are fed in parallel into positions 164 along nip 152. Molten resin is introduced across the entire nip, forming two bands of hooks in regions 166. Mold roll plates of appropriate widths and edge configurations are arranged to produce the ribs and grooves at the center of each closure strip. A splitting channel ring 168 at the center of the mold roll produces a splitting channel in the product, along which the resulting tape is split by a blade 170 (FIG. 7; either stationary or rotating) into two separate runs of closure strip which are separately spooled.

FIG. 7 also indicates several variations of the above-described method. For instance, rather than introduce the loop material 160 through nip 152 and thereby join it to the substrate as the substrate is molded, the loop material may be joined to the substrate after the substrate has been formed, such as is indicated by the run 160' of loop material shown in dashed outline. In this case, front face idler 172 is heated and has a contoured surface for producing the desired pattern of bonding between the loop material and the substrate. Paper may be joined to the back face of the substrate, to produce the product shown in FIG. 6, by either running a strip 174 of paper through nip 152 on the pressure roll side of the resin, or by adhering adhesive-coated paper 174' to the formed substrate either at stripping roll 158 or at idler 176. In some cases, adhesive-coated paper 174' includes a transfer coating, such that its paper backing may be peeled from the adhesive on the back of the product to secure the back of the final product to a supporting surface. The adhesive applied to the back of the product in this manner may be either a pressure-sensitive or heat-activated adhesive, for instance. For decreasing the permeability of the final product, a second flow of resin (either molten or in the form of a film) may be added to the nip against pressure roll 156, as strip 174 is shown, to form a backing on the final product. For instance, a layer of polyester may be added to reduce the permeability of a polyethylene closure strip, such as for packaging certain foods. The pattern of penetration of resin into the loop material in nip 152 is optionally controlled by adding a strip of barrier material 178 between the loop material and the molten resin. Barrier material 178 may be, for instance, a perforated paper or film that allows resin to pass into the loop material in selected regions but inhibits its flow into other regions, such as for producing the bonding pattern of the center region of loop material shown in FIG. 1G. The barrier material may also be a homogeneous sheet of material having a high porosity, equally limiting the penetration of resin into the loop material across the width of the barrier material. Rather than be introduced as a separate sheet, the barrier material may be pre-applied to the surface of loop material 160 and may be in the form of a binder located in discrete areas of the loop material and locally encapsulating fibers of the loop material, for instance. In many cases, the barrier material will be narrower than the loop material, and centered along the width of the loop material, to enable full penetration of resin into the edges of the loop material. In some cases, however, as to produce the bonding pattern of FIG. 1B, for instance, thin strips of barrier material may be run into the nip along the edges of the loop material to inhibit the bonding of edge regions 118 (FIG. 1B) to the substrate. Other arrangements of barrier and loop materials, and resulting bonding patterns, will be apparent upon reading this disclosure. In all cases, the barrier material should be selected for its low material cost and weight, as it will most likely be permanently bonded to the substrate and become an integral part of the final product.

Figure 9:
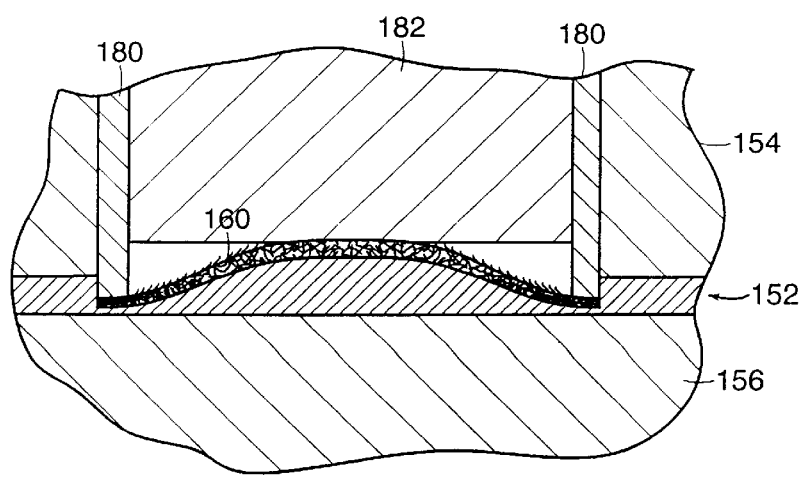
FIG. 9 is a highly enlarged view of the loop material securing region of the nip of FIG. 8.

FIG. 9 illustrates the bonding of the loop material 160 to the resin of the substrate in area 164 of nip 152 (FIG. 8). "Staking" rings 180 on either side of a reduced diameter plate 182 engage the edges of the loop material to locally hold the edges of the loop material against the resin of the substrate as the resin forms the substrate under nip pressure, thereby ensuring heavy penetration of the loop material in predetermined areas along its edges. This configuration shown in FIG. 9 produces the bonding pattern illustrated in FIG. 1A, the staking rings 180 forming heavily bonded edge regions 114, the width we corresponding to the width of the staking ring. The staking rings may extend slightly beyond the nominal mold roll diameter, as shown in FIG. 9, or be flush with adjoining mold roll rings (as shown in FIG. 9A, for example).

Figure 10:
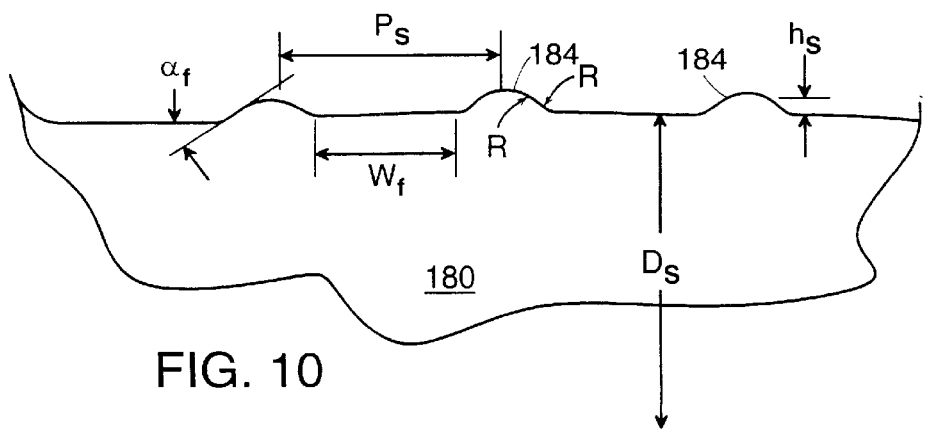
FIG. 10 is an enlarged view of a portion of the outer edge of a staking ring.

To form a row of heavily bonded points separated by regions of lower resin penetration, some staking rings 180 have a contoured outer edge as shown in FIG. 10. A series of protrusions 184 extending beyond the nominal diameter $D_s$ of the staking ring cause the resin to locally penetrate farther into the loop material. In this example configuration, $D_s$ is 9.968 inches, the height ($h_s$) of each protrusion 184 is 0.014 inch, and the inner and outer radii (R) at the flank of each protrusion is 0.015 inch. The protrusion pitch ($P_s$) is 0.190 inch, and the length of the flat between protrusions ($w_f$) is 0.130 inch. The dimensions of the protrusions are selected to attempt to optimize the maximum approach angle $\alpha_f$ of the protrusion flank with respect to a local ring tangent. A steep approach angle (i.e., an abrupt change in ring diameter) can cause a sharp local increase in nip pressure and an undesirable local flooding of the front side of the loop material with resin. Such flooded areas can create local "depth stops" to mating fastener elements, reducing the fastener element penetration into the loop material. A zero approach angle (i.e., no protrusions) would result in a homogeneous resin penetration beneath the staking ring, which may not be as desirable as local loop material "pillowing" (discussed above) in some applications. The maximum approach angle $\alpha_f$ in the illustrated staking ring embodiment is about 40 degrees. A shallower angle (e.g., of about 30 degrees) may be preferable in some cases, as may a longer spacing $w_f$ between protrusions to provide longer, lofted pillow regions.

Figure 9A:
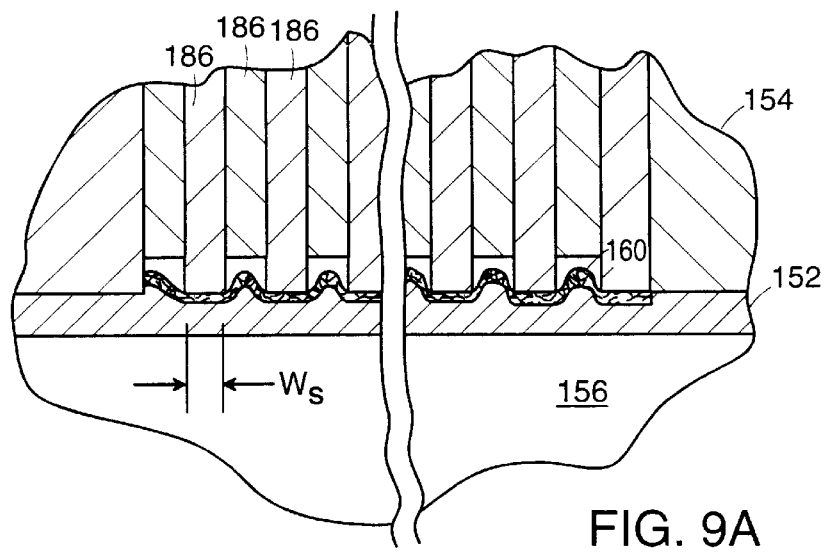
FIG. 9A illustrates an alternative arrangement of the loop material staking region.

FIG. 9A shows a staking ring configuration for producing the bonding pattern shown in FIG. 1E. Staking rings 186 having the profile shown in FIG. 10 are stacked together with staggered protrusions, such that the pattern of heavily bonded regions resembles a checkerboard with elongated "pillows" extending outward between the heavily bonded regions. The width $w_s$ of each ring is about 0.018 inch.

Figure 13:
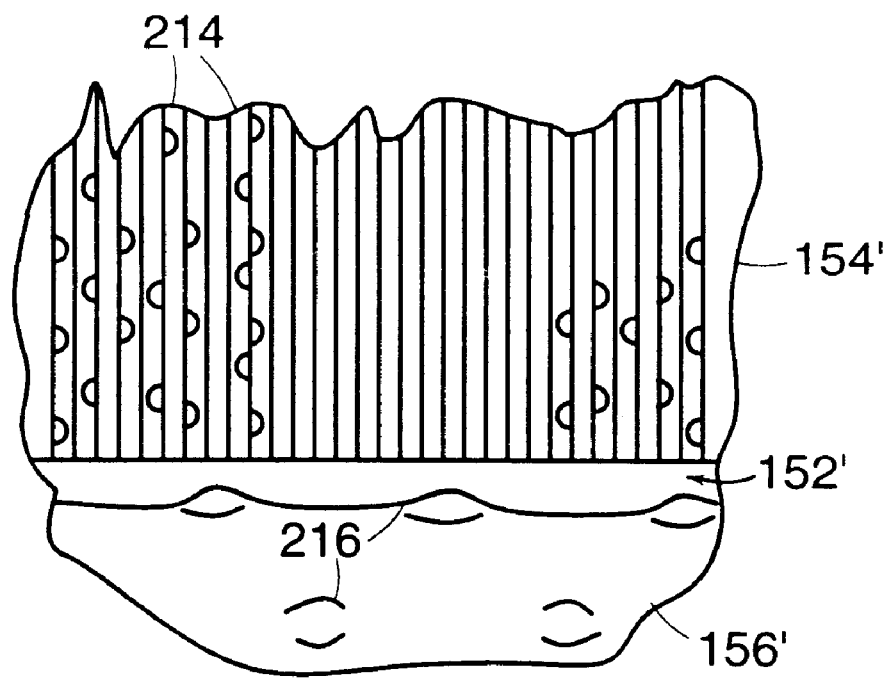
FIG. 13 shows a nip formed between a mold roll and a contoured pressure roll.

This in situ staking method for attaching loop material to the resin of a fastener substrate as the substrate is being formed has broad applicability to the production of composite touch fasteners. For example, FIG. 13 shows a nip 152' between a mold roll 154' and a pressure roll 156'. Mold roll 154' contains many thin fastener element molding rings 214, which may be alternated with spacer rings (not shown), to integrally mold fastener elements extending from one side of a sheet-form base as taught by Fischer. In this case, however, pressure roll 156' has a pattern of protrusions 216 extending from its otherwise smooth surface. The protrusions locally narrow gap 152' in discrete regions, causing a variation in nip pressure during formation of the fastener tape. Running a fibrous preformed material through the nip against the pressure roll with the molten resin, as taught by Kennedy, et al., will, in this configuration, cause fibers of the preformed material to be encapsulated more fully in the resin in areas corresponding to protrusions 216. This in situ "staking" method is particularly useful when the fibrous preformed material is a very porous, thin material such as a needled non-woven web with a low basis weight. The pattern of protrusions on the pressure roll is selected to form an inverse pattern of lofted "pillows" of loop material at most only partially encapsulated in the substrate resin.

Figure 14:
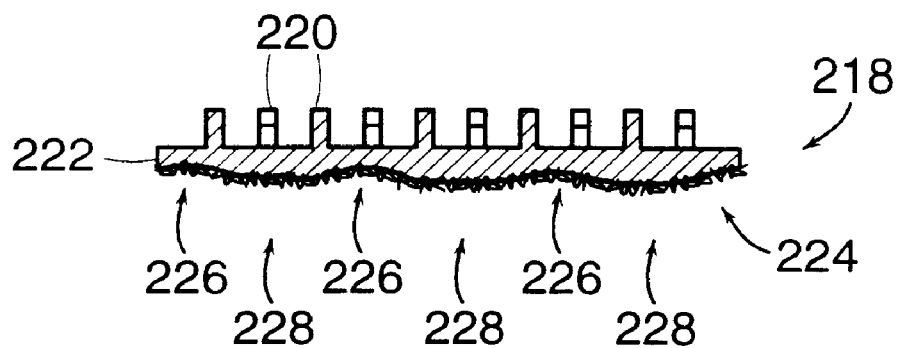
FIG. 14 is a transverse cross-section of a composite fastener tape formed in the nip of FIG. 13.

FIG. 14 is a transverse cross-section of a composite fastener tape 218 produced in this fashion, having an array of hook-shaped fastener elements 220 extending from one side of the substrate 222, and a lightweight, non-woven web of loop material 224 permanently bonded to an opposite side of the substrate. Loop material 224 is coextensive with the substrate in this case (i.e., it extends across the full width of the substrate), but is fully encapsulated in substrate resin only in discrete regions 226. Between regions 226, the loop material forms the above-described "pillows" 228, or lofted regions, which are not fully encapsulated in resin. The loft of pillows 228 enables the heads of fastener elements 220 to penetrate the loop material and engage individual fibers during fastening. A similarly contoured pressure roll 156' (FIG. 13) may also be employed to attach a strip of loop material to the fastener element side of a fastener tape.

Figure 11:
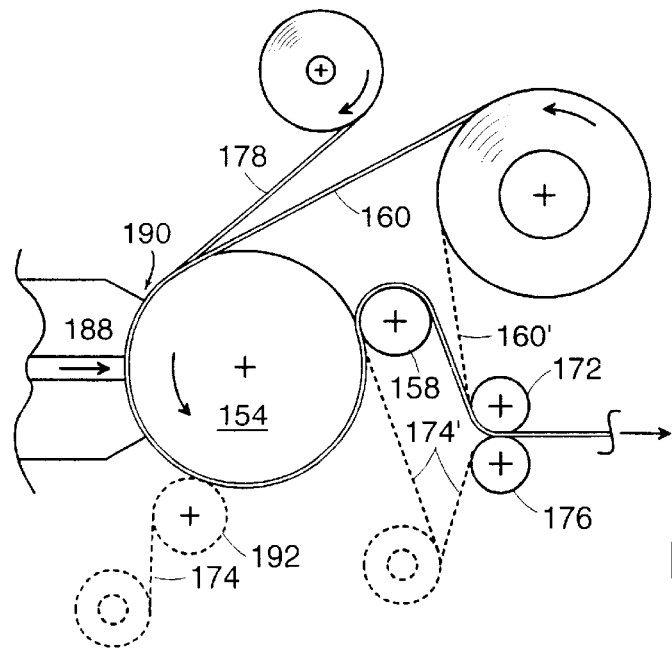
FIG. 11 illustrates a second method and apparatus for forming composite touch fastener tapes, such as the closure strips of FIGS. 1 and 6.

FIG. 11 illustrates an alternative method and apparatus for forming the above-described closure strips. The contoured surface of an extrusion head 188 (sometimes called an injection head) is placed adjacent a mold roll 154 (with fixed fastener element molding cavities as described above with respect to FIG. 7), and a continuous flow of molten resin is injected under pressure into the gap 190 defined between head 188 and mold roll 154, filling the fastener element cavities and forming the front and back faces of the substrate. The configuration and construction of mold roll 154 is the same as is shown in FIG. 8, in which member 156 may be taken to be the adjoining extrusion head. The strip 160 of loop material is fed through a predetermined region of gap 190, and held up against the surface of mold roll 154 by resin pressure in the gap. In this manner, the loop material is partially impregnated with substrate resin and permanently bonded to the front face of the substrate. In applications where it is not possible to fill the fastener element cavities without completely saturating the loop surface of the loop material with resin, a strip of barrier material 178 may be fed through gap 190 between head 188 and loop material 160. Barrier material 178 is discussed in more detail above with respect to FIG. 7. A strip 174 of paper or other suitable backing material may be laminated to the back face of the substrate while the molded product is retained on roll, by pressure supplied by a pressure roll 192, as shown in dashed outline. Alternatively, a strip of adhesive-coated paper 174' may be adhered to the formed substrate either at stripping roll 158 or at idler 176.

Figure 12:
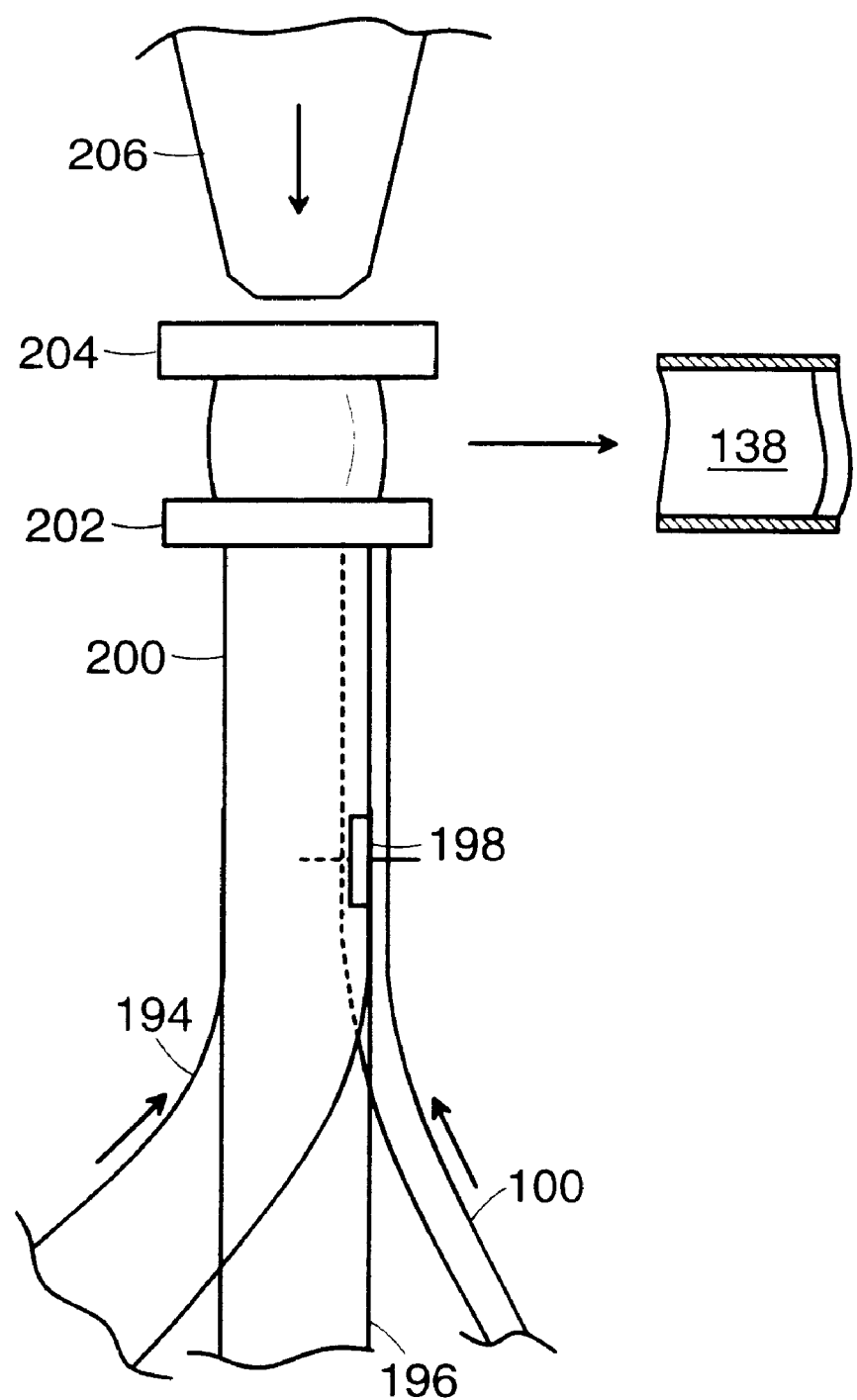
FIG. 12 illustrates a method and apparatus for forming bags.

FIG. 12 illustrates a method and apparatus for forming and filling bags (such as bag 138 of FIG. 4A). Closure strip 100 and a sheet of bag material 194 are each folded and fed about a longitudinal mandrel 196, with their edges overlapping at two points. In the embodiment shown, both the bag material 194 and the substrate of closure strip 100 are polyethylene. Two heated rollers 198 (only one visible from the perspective illustrated) weld the edges of the closure strip and bag material together to form a continuous tube 200 with two longitudinal sealed seams. In the apparatus shown, tube 200 extends upward through a lower sealing/cutting device 202 and an upper sealing device 204. In the bag forming and filling sequence, tube 200 is advanced upward until its open end is aligned with upper sealing device 204. Lower sealing/cutting device 202 then forms a transverse seal across the tube to form one sealed side of the resulting bag. The bag is then filled from above, through the still open end of the tube, with material supplied through chute 206. After a predetermined amount of material has been released into the bag, the open end of the tube is sealed by upper sealing device 204 to form a sealed bag 138, which is then severed from tube 200 by cutting the tube just below the previously formed transverse seal by lower sealing/cutting device 202. The resulting bag 138 has one edge 208 of folded bag material 194, two sealed edges 210, and one edge 212 of folded closure strip 100. Other standard sequences of forming and filling bags from tubes of preform material are known to those of normal skill in the art of bag-making. For instance, for sealing the paper-covered surface of closure strip 100' (FIG. 6) to a paper bag material 194, a layer of adhesive would normally be applied between the overlapping paper edges of the closure strip and bag material.

Similarly, the closure strip described above may be provided in form-filled packaging, such as that currently employed to package cookies and candy bars, as a releasable closure. In such cases, the closure strip may be located at one sealed end of the package, opposite another sealed end, or along a longitudinal seam of the package. By "bag", we mean to include such packages.

Other embodiments will be understood to fall within the scope of the following claims.

What is claimed is:

1. An elongated closure strip comprising:
   a sheet-form resin substrate having a front face from which an array of loop-engageable fastener elements extend in a discrete, longitudinal band, integrally molded with resin of the substrate; and
   a loop strip carried on the front face of the substrate and comprising a non-woven web of fibers forming a discrete band of hook-engageable loops extending along the length of the closure strip,
   the band of fastener elements extending longitudinally along the length of the closure strip and spaced apart from the band of loops, with the substrate defining a pair of grooves extending longitudinally along the length of the closure strip between the band of loops and the band of fastener elements.

2. The closure strip of claim 1 wherein the web has a basis weight of less than about 4 ounces per square yard.

3. The closure strip of claim 2 wherein said basis weight is less than about 2 ounces per square yard.

4. The closure strip of claim 1 wherein the non-woven web comprises a needled web in a stretched condition.

5. The closure strip of claim 1 wherein the loop strip has width defined between two longitudinal edges thereof, at least some of the fibers of the loop strip being affixed to the substrate across said width.

6. The closure strip of claim 5 wherein at least some of the fibers of the loop strip are encapsulated by resin of the substrate across said width.

7. The closure strip of claim 6 wherein the loop strip has a fiber density which is substantially constant across its width, and wherein the loop strip comprises discrete regions which are substantially more encapsulated by resin than other regions thereof.

8. The closure strip of claim 7 wherein said discrete regions are spaced apart longitudinally along the loop strip.

9. The closure strip of claim 7 wherein said discrete regions extend lengthwise along the loop strip and are spaced apart widthwise.

10. The closure strip of claim 7 wherein said discrete regions are arranged in a checkerboard pattern.

11. The closure strip of claim 1 wherein the loop strip has two longitudinal edge regions and a center region between the edge regions, the edge regions being affixed to the substrate and the center region being substantially loose from the substrate.

12. The closure strip of claim 11 wherein the center region of the loop strip defines a gentle arc extending away from the substrate.

13. The closure strip of claim 1 further comprising, between the substrate and the loop strip, a barrier layer of a different material than the substrate.

14. The closure strip of claim 13 wherein the barrier layer comprises paper.

15. The closure strip of claim 13 wherein the barrier layer comprises polymer resin.

16. The closure strip of claim 1 wherein open-ended pockets are defined between an edge of the loop strip and the substrate.

17. The closure strip of claim 1 wherein the loop strip comprises two longitudinal edge regions and a center region between the edge regions, the edge regions having fibers directly encapsulated within resin of the substrate, the closure strip further comprising a binder connecting fibers of the center region of the loop strip to resin of the substrate, the binder being of a different material than the substrate.

18. The closure strip of claim 1 wherein the loop material has two longitudinal edges, one of the longitudinal edges having discrete regions loose from the substrate.

19. The closure strip of claim 1 wherein the grooves are defined by molded surfaces of the substrate.

20. The closure strip of claim 1 wherein the grooves are defined in the front face of the substrate.

21. The closure strip of claim 1 wherein the grooves are lengthwise continuous.

22. The closure strip of claim 1 wherein the loop material has a longitudinal edge region loose from the substrate.

23. The closure strip of claim 1 wherein the loop material has two longitudinal edge regions running along either side of a center region, the edge regions being loose from the substrate.

24. The closure strip of claim 1 wherein the front face of the substrate has two longitudinal edge regions void of fastener elements and loops.

25. The closure strip of claim 24 wherein the longitudinal edge regions of the front face of the substrate are covered with a layer of adhesive for permanently attaching the closure strip to opposite sides of a bag.

26. The closure strip of claim 24 wherein the longitudinal edge regions of the front face of the substrate comprise exposed resin of the substrate, for permanently welding the closure strip to opposite sides of a bag formed of a compatible material.

27. The closure strip of claim 1 wherein the substrate has a back face opposite the front face, the back face including longitudinal edge regions, the closure strip further comprising a layer of adhesive disposed on the longitudinal edge regions of the back face for permanently attaching the closure strip to opposite sides of a bag.

28. The closure strip of claim 1 wherein the substrate has a back face opposite the front face, the back face including longitudinal edge regions comprising exposed resin of the substrate, for permanently welding the closure strip to opposite sides of a bag formed of a compatible material.

29. The closure strip of claim 1 wherein the substrate is formed of polyethylene.

30. The closure strip of claim 1 further comprising an adhesive strip carried on the front face of the substrate between the band of fastener elements and the band of loops, the adhesive strip having an exposed surface arranged to contact the front face of the closure strip when the closure strip is folded to engage the loops with the fastener elements, to retain the closure strip in a folded state.

31. The closure strip of claim 1 further comprising:
  a first adhesive strip carried on the front face of the substrate between the band of fastener elements and the pair of grooves; and
  a second adhesive strip carried on the front face of the substrate between the band of loops and the pair of grooves; the first and second adhesive strips having exposed surfaces arranged to contact each other when the closure strip is folded to engage the loops with the fastener elements, to retain the closure strip in a folded state.

32. The closure strip of claim 1 further comprising a layer of paper permanently adhered to the substrate.

33. The closure strip of claim 32 wherein the layer of paper is carried on the front face of the substrate, in longitudinal edge regions thereof.

34. The closure strip of claim 32 wherein the substrate has a back face opposite the front face, the paper being carried on the back face.

35. The closure strip of claim 32 wherein the layer of paper is disposed between a center region of the loop strip and the substrate.

36. An elongated closure strip comprising:
  a sheet-form resin substrate having a front face and a back face;
  a loop strip carried on the front face of the substrate and forming a discrete band of hook-engageable, extended loops along the length of the closure strip;
  an array of loop-engageable fastener elements carried on the front face of the substrate and forming a discrete band of fastener elements extending longitudinally along the length of the closure strip and spaced apart from the band of loops; the substrate defining
  a pair of grooves extending longitudinally along the length of the closure strip between the band of loops and the band of fastener elements; and
  a longitudinal rib integrally molded with and extending from the substrate between the pair of grooves.

37. The closure strip of claim 36 wherein the loop strip comprises a non-woven web of entangled fibers forming the loops and having a basis weight of less than about 4 ounces per square yard.

38. The closure strip of claim 36 wherein the grooves and rib are disposed on the front face of the substrate.

39. An elongated closure strip comprising:
  a sheet-form resin substrate having a front face and a back face;
  a loop strip carried on the front face of the substrate and forming a discrete band of hook-engageable, extended loops along the length of the closure strip, the loop strip having width and a fiber density which is substantially constant across its width, the loop strip being at least partially encapsulated in resin of the substrate across its width, the loop strip having discrete regions which are more encapsulated by resin than other regions thereof; and
  an array of loop-engageable fastener elements carried on the front face of the substrate and forming a discrete band of fastener elements extending longitudinally along the length of the closure strip and spaced apart from the band of loops.

40. The closure strip of claim 39 wherein the fastener elements are integrally molded with resin of the substrate.

41. The closure strip of claim 39 wherein the substrate has a back face opposite the front face, the back face including longitudinal edge regions, the closure strip further comprising a layer of adhesive disposed on the longitudinal edge regions of the back face for permanently attaching the closure strip to opposite sides of a bag.

42. The closure strip of claim 39 wherein the substrate has a back face opposite the front face, the back face including longitudinal edge regions comprising exposed resin of the substrate, for permanently welding the closure strip to opposite sides of a bag formed of a compatible material.

43. The closure strip of claim 39 further comprising an adhesive strip carried on the front face of the substrate between the band of fastener elements and the band of loops, the adhesive strip having an exposed surface arranged to contact the front face of the closure strip when the closure strip is folded to engage the loops with the fastener elements, to retain the closure strip in a folded state.

44. The closure strip of claim 39 wherein the substrate defines a pair of grooves extending longitudinally along the length of the closure strip between the band of loops and the band of fastener elements.

45. The closure strip of claim 39 further comprising a longitudinal rib integrally molded with and extending from the front face of the substrate between the band of loops and the band of fastener elements.

46. A composite touch fastener comprising
  an elongated, sheet-form resin substrate;
  a fibrous loop strip partially encapsulated in resin of the substrate, the loop strip having discrete regions which are substantially more encapsulated by resin than other regions thereof; and
  an array of loop-engageable fastener elements integrally molded with resin of the substrate.

47. The composite touch fastener of claim 46 wherein the loop strip has width defined between two longitudinal edges thereof, and a substantially constant fiber density across said width.

48. The composite touch fastener of claim 46 wherein the strip of loop material has regions of substantially higher loft than regions corresponding to said discrete regions which are substantially more encapsulated by resin.

49. The composite touch fastener of claim 46 wherein the strip of loop material comprises a non-woven web of entangled fibers forming loops and having a basis weight of less than about 4 ounces per square yard.

50. The composite touch fastener of claim 46 wherein the strip of loop material comprises a non-woven web of fibers.

51. An elongated closure strip comprising:
  a sheet-form resin substrate having a front face;
  a loop strip carried on the front face of the substrate and comprising a non-woven web of fibers having a basis weight of less than about 4 ounces per square yard and a substantially constant fiber density throughout, the loop strip forming a discrete band of hook-engageable loops extending along the length of the closure strip, at least some of the fibers of the loop strip being at least partially encapsulated by resin of the substrate; and an array of loop-engageable fastener elements integrally molded with resin of the front face of the substrate and forming a discrete band of fastener elements extending longitudinally along the length of the closure strip and spaced apart from the band of loops; the front face of the substrate defining a pair of grooves defined by molded surfaces extending longitudinally along the length of the closure strip between the band of loops and the band of fastener elements, a longitudinal rib integrally molded with and extending from the front face of the substrate between the band of loops and the band of fastener elements, and two longitudinal edge regions void of fastener elements and loops.

52. An elongated closure strip comprising:

a sheet-form resin substrate having a front face;

a loop strip carried on the front face of the substrate and comprising a non-woven web of fibers forming a discrete band of hook-engageable loops extending along the length of the closure strip, the loop strip having width defined between two longitudinal edges thereof, at least some of the fibers of the loop strip being affixed to the substrate across said width by being encapsulated by resin of the substrate across said width, the loop strip having a fiber density which is substantially constant across its width, and wherein the loop strip comprises discrete regions which are substantially more encapsulated by resin than other regions thereof; and an array of loop-engageable fastener elements integrally molded with resin of the front face of the substrate and forming a discrete band of fastener elements extending longitudinally along the length of the closure strip and spaced apart from the band of loops.

53. The closure strip of claim 52 wherein said discrete regions are spaced apart longitudinally along the loop strip.

54. The closure strip of claim 52 wherein said discrete regions extend lengthwise along the loop strip and are spaced apart widthwise.

55. The closure strip of claim 52 wherein said discrete regions are arranged in a checkerboard pattern.

56. An elongated closure strip comprising:

a sheet-form resin substrate having a front face;

a loop strip carried on the front face of the substrate and comprising a non-woven web of fibers forming a discrete band of hook-engageable loops extending along the length of the closure strip;

an array of loop-engageable fastener elements integrally molded with resin of the front face of the substrate and forming a discrete band of fastener elements extending longitudinally along the length of the closure strip and spaces apart from the band of loops; and a barrier layer of a different material than the substrate between the substrate and the loop strip.

57. The closure strip of claim 56 wherein the barrier layer comprises paper.

58. The closure strip of claim 56 wherein the barrier layer comprises polymer resin.

59. An elongated closure strip comprising:

a sheet-form resin substrate having a front face;

a loop strip carried on the front face of the substrate and comprising a non-woven web of fibers forming a discrete band of hook-engageable loops extending along the length of the closure strip, the loop strip comprising two longitudinal edge regions and a center region between the edge regions, the edge regions having fibers directly encapsulated within resin of the substrate, the closure strip further comprising a binder connecting fibers of the center region of the loop strip to resin of the substrate, the binder being of a different material than the substrate; and an array of loop-engageable fastener elements integrally molded with resin of the front face of the substrate and forming a discrete band of fastener elements extending longitudinally along the length of the closure strip and spaced apart from the band of loops.

60. An elongated closure strip comprising:

a sheet-form resin substrate having a front face;

a loop strip carried on the front face of the substrate and comprising a non-woven web of fibers forming a discrete band of hook-engageable loops extending along the length of the closure strip;

an array of loop-engageable fastener elements integrally molded with resin of the front face of the substrate and forming a discrete band of fastener elements extending longitudinally along the length of the closure strip and spaced apart from the band of loops; and a longitudinal rib integrally molded with and extending from the front face of the substrate between the band of loops and the band of fastener elements.

61. The closure strip of claim 60 wherein the substrate has a back face opposite the front face, the back face including longitudinal edge regions, the closure strip further comprising a layer of adhesive disposed on the longitudinal edge regions of the back face for permanently attaching the closure strip to opposite sides of a bag.

62. The closure strip of claims wherein the substrate has a back face opposite the front face, the back face including longitudinal edge regions comprising exposed resin of the substrate, for permanently welding the closure strip to opposite sides of a bag formed of a compatible material.

63. The closure strip of claim 1 further comprising an adhesive strip carried on the front face of the substrate between the band of fastener elements and the band of loops, the adhesive strip having an exposed surface arranged to contact the front face of the closure strip when the closure strip is folded to engage the loops with the fastener elements, to retain the closure strip in a folded state.

64. An elongated closure strip comprising:

a sheet-form resin substrate having a front face;

a loop strip carried on the front face of the substrate and comprising a non-woven web of fibers forming a discrete band of hook-engageable loops extending along the length of the closure strip;

an array of loop-engageable fastener elements integrally molded with resin of the front face of the substrate and forming a discrete band of fastener elements extending longitudinally along the length of the closure strip and spaced apart from the band of loops; and an adhesive strip carried on the front face of the substrate between the band of fastener elements and the band of loops, the adhesive strip having an exposed surface arranged to contact the front face of the closure strip when the closure strip is folded to engage the loops with the fastener elements, to retain the closure strip in a folded state.

* * * * *

UNITED STATES PATENT AND TRADEMARK OFFICE
CERTIFICATE OF CORRECTION

PATENT NO. : 6,202,260 B1 Page 1 of 1
DATED : March 20, 2001
INVENTOR(S) : William Clune et al.

It is certified that error appears in the above-identified patent and that said Letters Patent is hereby corrected as shown below:

<u>Column 24,</u>
Line 36, "claims" should be -- claim --.
Line 36, insert -- 60 -- after "claim".

Signed and Sealed this

Tenth Day of February, 2004

JON W. DUDAS
*Acting Director of the United States Patent and Trademark Office*